United States Patent [19]

Kalman et al.

[11] Patent Number: 5,428,283
[45] Date of Patent: Jun. 27, 1995

[54] POWER FACTOR CONTROL OF PULSE WIDTH MODULATED INVERTER SUPPLIED PERMANENT MAGNET MOTOR

[75] Inventors: Gabor Kalman, Los Angeles; Colin Huggett, Torrance, both of Calif.

[73] Assignee: Alliedsignal Inc., Morris Township, N.J.

[21] Appl. No.: 250,394

[22] Filed: May 26, 1994

[51] Int. Cl.⁶ .................................. H02P 7/42
[52] U.S. Cl. ......................... 318/729; 318/438
[58] Field of Search ..................... 318/798–815, 318/729; 363/40, 41, 45, 80, 81, 84, 95; 323/207, 205

[56] References Cited

U.S. PATENT DOCUMENTS

| | | | |
|---|---|---|---|
| 4,047,083 | 9/1977 | Plunkett | 363/41 X |
| 4,186,334 | 1/1980 | Hirata | 318/805 |
| 4,520,437 | 5/1985 | Boettcher et al. | 363/41 |
| 4,533,836 | 8/1985 | Carpenter et al. | 363/49 X |
| 4,575,668 | 3/1986 | Baker | 318/811 |
| 4,772,996 | 9/1988 | Hanei et al. | 318/811 X |
| 4,788,485 | 11/1988 | Kawagishi et al. | 318/811 |
| 4,855,652 | 8/1989 | Yamashita et al. | 318/803 X |
| 4,984,147 | 6/1991 | Araki | 363/84 |
| 5,140,514 | 8/1992 | Tuusa et al. | 363/81 |
| 5,184,057 | 2/1993 | Sakai et al. | 318/803 |
| 5,187,427 | 2/1993 | Erdman | 323/207 |
| 5,285,145 | 2/1994 | Minowa et al. | 318/808 |
| 5,329,222 | 7/1994 | Gyugyi | 323/207 |

Primary Examiner—Jonathan Wysocki
Attorney, Agent, or Firm—John R. Rafter

[57] ABSTRACT

Power factor control of a pulse width modulated inverter supplied permanent magnet motor is achieved by using Park Vectors for automatically adjusting a pulse width modulating signal for approximately unity power factor, thereby avoiding the heretofore required manual adjustment during operation of the motor for power factor changes in accordance with changes in EMF and motor resistance.

9 Claims, 3 Drawing Sheets

POWER FACTOR CONTROL OF PULSE WIDTH MODULATED INVERTER SUPPLIED PERMANENT MAGNET MOTOR

BACKGROUND OF THE INVENTION

Pulse width modulated (PWM) inverter supplied permanent magnet (PM) motors can be operated and controlled as variable-speed synchronous machines. Two independent parameters, i.e. the load angle and the ratio between applied voltage and EMF, can be used for real power (torque) control and reactive power (power factor) control, respectively. The present invention is concerned with power factor control.

The parameter used for reactive or power factor control is the amplitude of a pulse width modulating signal. This signal is automatically adjusted as a function of motor speed, DC link voltage and load angle. However, power factor can vary as changes in the EMF (magnet strength) and motor resistance occur, usually due to temperature changes. Heretofore, these EMF and resistance variations were compensated for manually during the operation of the motor.

The present invention automatically adjusts the pulse width modulating signal for approximately unity power factor operation using Park Vectors or space Vectors as they are more commonly known.

It will be appreciated that traditionally power factor has been defined only in terms of sinusoidal quantities. Direct measurement of power factor requires monitoring of zero-crossovers of voltage and current waveforms. The time difference between corresponding zero-crossover instances is a measure of power factor. If voltage and/or current waveforms have a high harmonic content, heavy filtering is required for unambiguous results.

An alternate way to measure power factor related quantities is to generate the reactive component of current. Due to the harmonics generated by the pulse width modulating process, Park Vectors must be used in place of the usual sinusoidal phasor quantities. Park Vectors inherently contain information on both the instantaneous magnitudes and phase relationship of three-phase rotating fields with respect to a reference coordinate system. Therefore, in a "synchronously rotating coordinate frame" the imaginary component of the current Park Vector is a measure of reactive power and power factor.

The signals available to generate the required Park Vectors are modulating voltage (from EMF feedback) and motor current. Signals from at least two phases must be available, and motor current can be filtered or unfiltered.

To appreciate the Park Vector features of the present invention, it will first be understood that "vector diagrams" have long been used to graphically describe the performance of electrical machines. The term "vector diagram" has generally been replaced by the term "phasor diagram." As long as the voltages and currents represented in these diagrams are steady state sinusoidal quantities, there is little distinction between the terms. The primary feature of a phasor diagram is that it can display the steady-state phase difference between a voltage and its associated current. The "phase shift" between the voltage and the current in a phasor diagram is a measure of power factor.

When electrical quantities are non-sinusoidal and/or in a transient state, the phase relationship between a voltage and its associated current can vary from instant to instant and "phase shift" has no meaning at a given instant. The circumstances become even more complex in the case of three phase electrical machines, since the voltages and currents of the individual phase windings, in both the machine stator and rotor, can vary independently of each other. Thus, simple phasor diagrams are not sufficient to describe the aforementioned non-sinusoidal and/or transient phenomena. For this reason Park Vectors (also referred to as three-phase vectors or space vectors) are introduced.

Park Vectors described as aforenoted and as applied to a three phase electrical machine are described in the text "Transient Phenomena In Electrical machines" by P. K. Kovacs, published by Elsevier in 1984, the same being incorporated herein by reference. It should be noted that under steady-state conditions a Park Vector degenerates into a phasor.

The applicants herein are aware of the following prior art relating generally to the present invention: U.S. Pat. No. 4,047,083 which issued to Plunkett on Sep. 6, 1977 (U.S. Class 318/231); U.S. Pat. No. 4,186,334 which issued to Hirata on Jan. 29, 1980 (U.S. Class 318/805); U.S. Pat. No. 4,533,836 which issued to Carpenter, et al on Aug. 6, 1985 (U.S. Class 307/11); U.S. Pat. No. 4,772,996 which issued to Hanei, et al on Sep. 20, 1988 (U.S. Class 363/41); U.S. Pat. No. 4,788,485 which issued to Kawagishi, et al on Nov. 29, 1988 (U.S. Class 318/811); and U.S. Pat. No. 4,855,652 which issued to Yamashita, et al on Aug. 8, 1989 (U.S. Class 318/268).

The Plunkett '083 patent discloses a regulating and control circuit for an adjustable speed motor involving a torque regulator. The torque regulator causes a frequency command signal to differ from the actual speed feedback signal of the motor. An inverter whose power is taken from a power source supplies power to three phase stator windings of the motor.

Hirata '334 discloses a control system for an AC motor involving a power factor detector, an adder/subtractor circuit, and an inverter. The power factor detector differentiates the signal from a phase controller.

The Carpenter '836 patent discloses a multi-voltage switching power supply comprising solid state switches and pulse width modulation circuits. Circuits are operated by a fifty percent duty cycle control circuit. The peak value of the current applied to the power supply circuit is controlled by adjusting the closure time of switches.

The Hanei '996 patent discloses a load current detecting device for a pulse width modulated inverter involving a DC power source, a main circuit and a waveform command generating circuit. The circuit generates a three phase output.

The Kawagishi '485 patent discloses a circuit for controlling an AC motor involving a three phase source, a three phase converter, a pulse width modulated inverter and a current detector circuit (40). The current detector circuit detects the DC current passing through the motor.

The Yamashita '652 patent discloses a speed control device for a motor, comprising a microcomputer, an inverter driver, an inverter and a current controller. The controller controls the waveform and magnitude of the power supply current.

None of the aforementioned patents teach the particular arrangement herein disclosed as will be discerned from the description which follows.

SUMMARY OF THE INVENTION

This invention contemplates a power factor control arrangement for pulse width modulated inverter supplied permanent magnet motors wherein information derived from voltage and current Park Vectors is used to maintain approximately unity power factor over a wide range of EMF (i.e. magnet strength) and/or temperature (i.e. ohmic resistance) changes.

An inverter supplied permanent magnet motor operates as a variable voltage, variable frequency synchronous motor. The inverter is voltage fed so that real power (or active power) to the motor can be controlled via a phase locked loop type load angle (or torque angle) controller. Since the synchronous machine is excited by a permanent magnet, the only control for reactive power is the terminal voltage of the machine. Thus, if the voltage fed inverter is pulse width modulated, reactive power control is accomplished by changing the modulation depth.

Under non-sinusoidal and/or transient conditions, reactive power cannot be determined from phase shift (or more precisely, from the time differences between the voltage and the current waveform zero crossovers).

Accordingly, Park Vectors are used to characterize and control reactive power. To this extent, at appropriate sampling intervals, voltage and current Park Vectors are determined. At each sampling interval, the current Park Vector is converted into components. One of the components is "in phase" at the sampling instant with the voltage Park Vector and another of the components is "in quadrature" at the same sampling instant. At each sampling interval, a control power level signal is generated which is proportional to the aforementioned "in quadrature" component of the current Park Vector and the signal is subtracted from the desired "in quadrature" current value (which is zero). The difference is an error signal which by means of a closed loop control is used to vary the control parameter, i.e. the pulse width modulated modulation depth signal.

Depending on the sampling frequency and on the dynamics of the control loop, the "in quadrature" component of the current Park Vector can be minimized (as measured by its deviation from the desired value, i.e. zero).

DETAILED DESCRIPTION OF THE INVENTION

Figure 1:
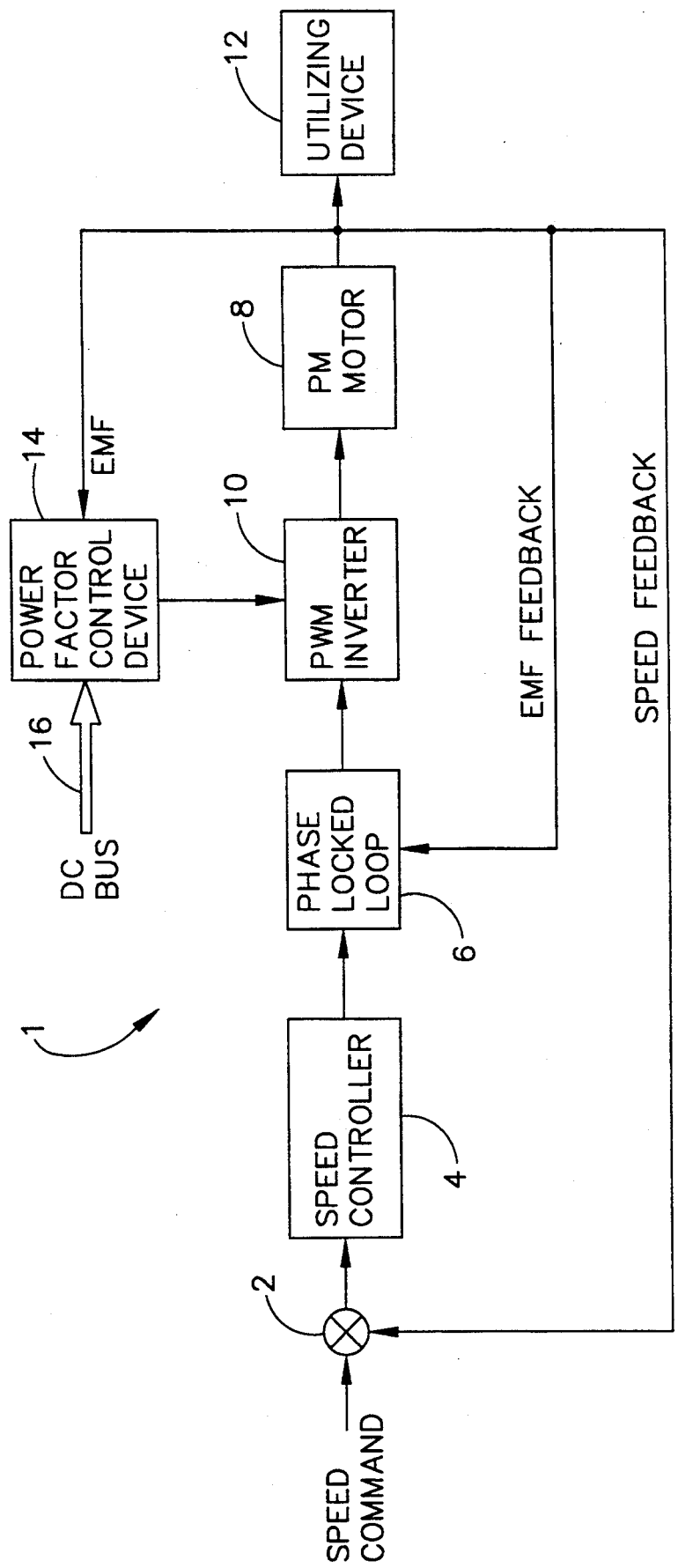
FIG. 1 is a block diagram illustrating an electric drive control system including a speed control loop with subordinated real (torque) and reactive (power factor) power control in accordance with the prior art.

With reference first to FIG. 1, an electric drive control system is designated by the numeral 1.

System 1 includes a summing means 2 which sums a speed command signal and a speed feedback signal and provides a summation signal which is applied to a speed controller 4. Speed controller 4 provides a load angle command signal which is applied to a phase locked loop 6. Phase locked loop 6 receives an electromagnetic force (EMF) feedback from a phase modulated motor 8 and applies a phase locked signal to a pulse width modulated (PWM) inverter 10. The output from inverter 10 is applied to motor 8. Motor 8 provides an output for driving a utilizing device 12 which may be for purposes of illustration a hydraulic pump.

Motor 8 provides the speed feedback to summing means 2 and provides EMF feedback to phase locked loop 6 and to a power factor control device 14.

Power factor control device 14 receives an input from a DC bus 16.

System 1 is illustrative of a PWM inverter supplied PM motor drive which can be operated and controlled as a variable speed synchronous machine. Two independent parameters, (1) load angle and (2) the voltage ratio between applied voltage versus EMF, are used for real power (torque) control and reactive (power factor) control, respectively, although the present invention is concerned only with power factor control as aforenoted.

The parameter used for reactive power control is the amplitude of the PWM modulating signal which is automatically adjusted as a function of motor speed, DC link voltage and load angle as will be discerned from FIG. 1. In addition to these variables, however, reactive power and, of course, power factor, can vary as changes in the electromagnetic force and motor resistance occur, most typically due to temperature variations. In accordance with the prior art, these relatively slow variations in EMF and ohmic resistance values are only manually adjusted during the operation of the PM motor drive.

In accordance with the present invention, control is automatically achieved by adjusting the PWM modulating signal for unity power factor.

In the traditional sense, power factor is defined in terms of sinusoidal quantities. Typically, direct measurement of power factor requires monitoring zero crossovers of voltage and current waveforms. The time differences between the corresponding zero crossover instances is a measure of power factor. If voltage and/or current waveforms have a high harmonic content, unambiguous detection of the zero crossovers requires heavy filtering.

Alternatively, quantities related to power factor can be measured by generating the reactive component of current. Due to the harmonics generated by pulse width modulating (PWM), Park Vectors must be used in place of usual sinusoidal phasor quantities. It will be appreciated that Park Vectors inherently contain information relating to both the instantaneous magnitudes and phase relationship of three phase rotating "fields" with respect to a reference coordinate system and in this regard, reference is made to the aforegoing discussion relating to Park Vectors.

Figure 2:
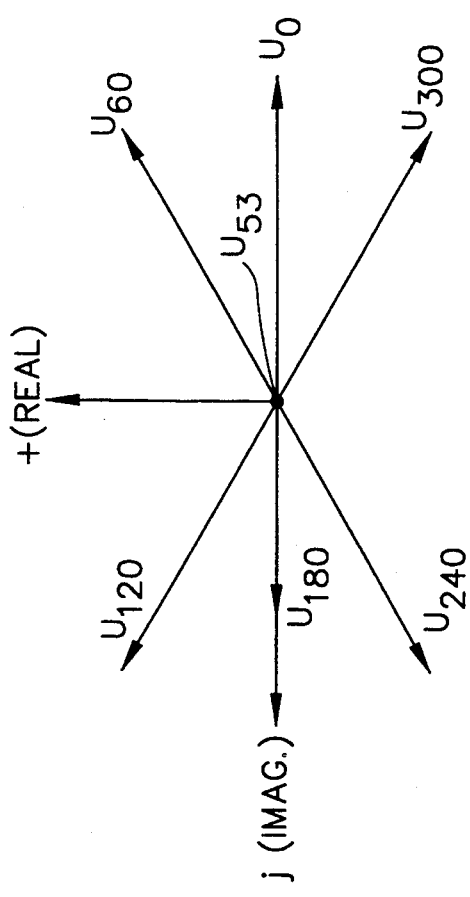
FIG. 2 is a Park Vector representation derived according to the invention.
Figure 3:
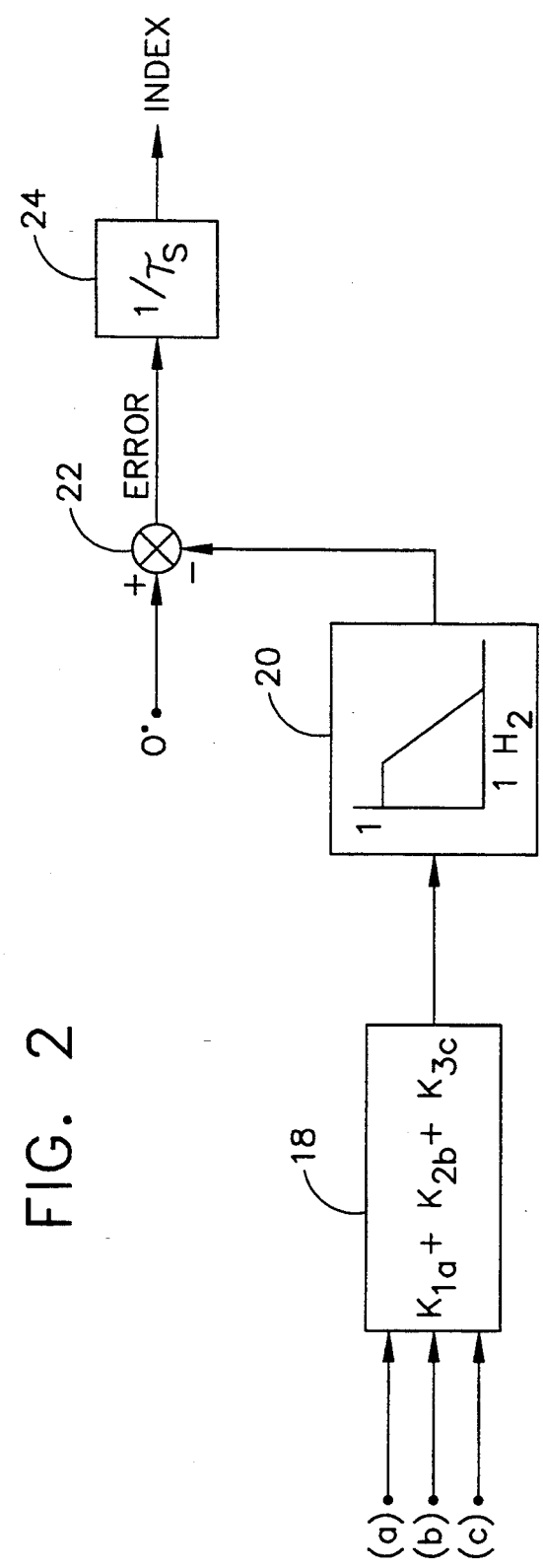
FIG. 3 is a block diagram illustrating reactive power control according to the invention.

With reference then to FIGS. 2 and 3, motor phase currents are measured at sixty degree intervals, referred to the fundamental frequency that is generated by the voltage fed inverter gating and logic circuits (PWM inverter 10 in FIG. 1). It should be noted that in a Park Vector representation, the motor terminal voltage locus has only seven discrete positions, as particularly illustrated in FIG. 2. In six of these positions, the vector shifts by sixty degrees. In the seventh position (at the origin of the complex domain) which represents a modulated condition when all upper or lower transistors of inverter 10 are simultaneously gated on, a three phase short is created at the motor terminals.

With the three phase motor currents measured at the sampling (sixty degree) intervals, the reactive ("in quadrature") component of the current Park Vector is determined with the aid of the following look up table:

| Angle | $K_1$ | $K_2$ | $K_3$ |
|---|---|---|---|
| 0° | 2/3 | −1/3 | −1/3 |
| 60° | 1/3 | 1/3 | −2/3 |
| 120° | −1/3 | 2/3 | −1/3 |
| 180° | −2/3 | 1/3 | 1/3 |
| 240° | −1/3 | −1/3 | 2/3 |
| 300° | 1/3 | −2/3 | 1/3 |

Thus, with reference to FIG. 2, $U_0$ is the voltage Park Vector at 0°; $U_{60}$ is the voltage Park Vector at 60°; $U_{120}$ is the voltage Park Vector at 120° and so forth, as more fully illustrated in the Figure. $U_{S3}$ is the three phase short at the motor terminals heretofore referred to.

The sixty degree interval to which the current vector belongs (designated as 0, 60, 120, etc. in the look up table) is determined from gating logic in inverter 10 shown in FIG. 1.

With particular reference to FIG. 3, motor phase (a, b and c) currents are sampled at sixty degree intervals and are applied to gating logic 18 in inverter 10. The output from gating logic 18 is the signal which represents the reactive current component, and which signal is heavily filtered by a first order low pass filter 20 before it is applied to a summing means 22 where it is summed with a zero degree angle signal. Summing means 22 provides an error signal which is applied to a closed loop regulating circuit 24. The output of closed loop regulating circuit 24 becomes the modulation depth index of PWM inverter 10 (ranging from 0 to 1.0 per unit value for the motor terminal voltage). Thus, regulating circuit 24 provides an index which is equal to an index plus a constant K plus an error, where constant K equals 0.01 executed once every sixty degrees at, for example, 200 μsec at 50 KRPM.

Figure 4:
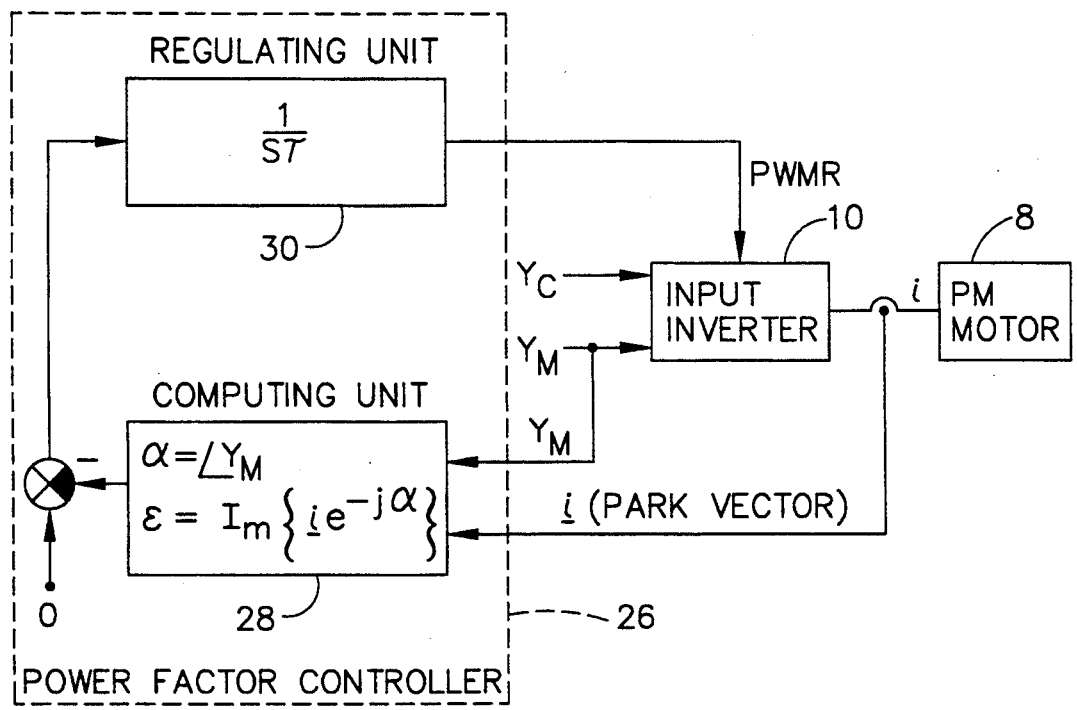
FIG. 4 is a block diagram illustrating the concept of the invention.

With reference to FIG. 4, a power factor controller in accordance with the present invention is designated by the numeral 26. Power factor controller 26 includes a computing unit 28. Computing unit 28 enables extraction of information relating to the phase of the applied voltage, i.e. the voltage from PWM inverter 10 (FIG. 1), from the conventional modulating signal ($Y_m$) and carrier signal ($Y_c$) applied to the PWM inverter. That phase information designated as $\alpha$ in FIG. 4 can be used to compute the reactive component of the current Park Vector (always phased with respect to the currently applied voltage vector). This computed (feedback) signal is then compared with the commanded reactive power signal (which is equal to zero). The resulting closed loop error signal ($\epsilon$) is used to adjust, via a regulating unit 30 in power factor controller 26, the modulation index (PWMR) of PWM inverter 10 until the desired, i.e. zero, reactive power (or more precisely reactive current) conditions are established. To put it another way, regulating unit 30 provides the modulation index (PWMR) and PWM inverter 10 responds to the modulation index to provide desired reactive power (current) conditions.

Figure 5:
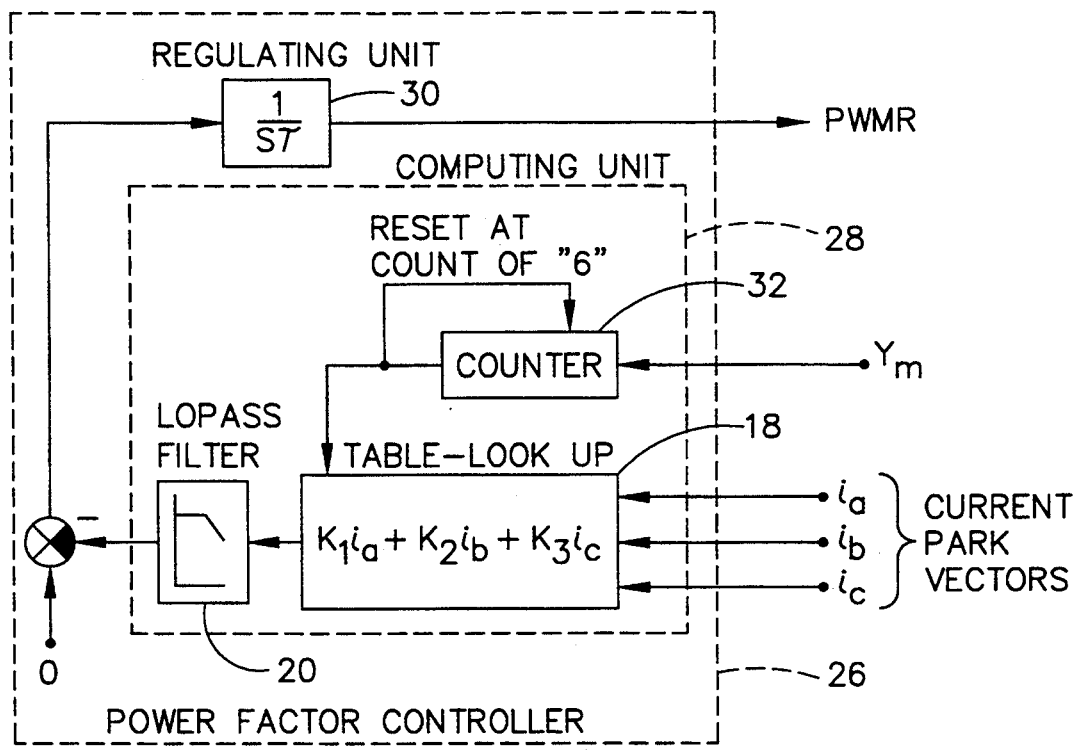
FIG. 5 is a block diagram illustrating an implementation of the concept illustrated in FIG. 4.

The orientation and interfaces of power factor controller 26 shown in FIG. 5 are identical to those shown in FIG. 4.

Computing unit 28 receives a sampled phasing signal at sixty degree intervals in the form of pulses originating from phase locked loop 6 (FIG. 1) that is involved with a sine wave modulating signal ($Y_m$ in FIG. 5). An internal counter 32 (with a reset count of 6) keeps track of the pulse number. A specific pulse number identifies the position, i.e. phase, of the applied voltage Park Vector. The computation of the reactive current component of the current Park Vector is defined with respect to this voltage Park Vector. The reactive component of the current Park Vector is determined via the aforegoing look up table at the beginning of each sixty degree interval.

The signal so determined is processed through low-pass filter 20 and applied through integrator-type regulating unit 30 to adjust the modulation index (PWMR in FIG. 5).

Thus, and with reference to the aforegoing description of the invention and the drawings, it will be appreciated that the pulse width modulating signal is automatically adjusted for approximately unity power factor using Park Vectors and therefore avoids the heretofore required manual compensation during operation of the motor for power factor changes in accordance with changes in EMF and motor resistance.

With the above description of the invention in mind, reference is made to the claims appended hereto for a definition of the scope of the invention.

What is claimed is:

1. Apparatus for power factor control of pulse width modulated inverter supplied permanent magnet motor, comprising:
   means for determining voltage and current Park Vectors (space vectors) at predetermined sampling instants;
   means for converting the current Park Vector into first and second components, the first component being "in phase" with the voltage Park Vector and the second component being "in quadrature" with said voltage Park Vector at a sampling instant;
   means for generating a control power level signal at each sampling instant, said control power level signal being proportional to the second component of the current Park Vector;
   means for subtracting the control power level signal from a desired "in quadrature" current value to provide a difference signal;
   means responsive to the difference signal for providing a pulse width modulated modulation depth signal; and
   means responsive to the pulse width modulated depth signal for controlling the motor.

2. Apparatus as described by claim 1, wherein:
   the "in quadrature" current value is zero.

3. Apparatus for power factor control of a pulse width modulated inverter supplied permanent magnet motor, comprising:
   means responsive to motor phase currents sampled at predetermined intervals for providing a signal which represents a reactive current component;
   means for filtering the reactive current component signal;
   means for summing the filtered reactive current component signal with a zero valued angle signal and for providing an error signal;

regulating means responsive to the error signal for providing a signal which is a modulation depth index for a pulse width modulated inverter; and the pulse width modulated inverter connected to the motor for controlling the motor.

4. Apparatus as described by claim 3, wherein:

the predetermined sampling intervals are 60 degrees apart, referred to a fundamental frequency generated by the pulse width modulated inverter.

5. Apparatus as described by claim 3, wherein:

the modulation depth index ranges from 0 to 1.0 per unit value of the motor terminal voltage.

6. A method for power factor control of a pulse width modulated inverter supplied permanent magnet motor, comprising:

extracting information relating to the phase of an applied voltage from a pulse width modulated inverter;

using the extracted phase information for determining a signal representative of the reactive component of a current Park Vector (space vector);

phasing the reactive component of the determined current Park Vector signal with respect to a currently applied voltage Park vector signal;

comparing the phased determined current Park Vector signal to a commanded reactive power signal, said comparison providing a closed loop error signal;

using the error signal for adjusting the modulation index of the pulse width modulated inverter until a desired reactive power condition is established; and controlling the motor with the pulse width modulated inverter.

7. A method as described by claim 6, wherein:

the commanded reactive power signal is zero; and the desired reactive power condition is zero.

8. A method as described by claim 6, including:

filtering the reactive component of the current Park Vector signal.

9. A method as described by claim 6, including:

extracting information relating to the phase of an applied voltage from a pulse width modulated inverter at 60 degree intervals.

* * * * *